United States Patent [19]

Moore

[11] 4,392,481

[45] Jul. 12, 1983

[54] SOLAR COLLECTOR APPARATUS HAVING INCREASED ENERGY REJECTION DURING STAGNATION

[75] Inventor: Stanley W. Moore, Los Alamos, N. Mex.

[73] Assignee: The United States of America as represented by the United States Department of Energy, Washington, D.C.

[21] Appl. No.: 225,493

[22] Filed: Jan. 16, 1981

[51] Int. Cl.³ .............................................. F24J 3/02
[52] U.S. Cl. .................................. 126/418; 126/422; 126/426; 126/444; 126/429
[58] Field of Search ............... 126/418, 422, 426, 444, 126/429

[56] References Cited

U.S. PATENT DOCUMENTS

| 3,908,631 | 9/1975 | Rom ..................................... 126/426 |
| 3,949,095 | 4/1976 | Pelehach et al. ............... 126/426 X |
| 4,036,209 | 7/1977 | Press ................................. 126/426 X |
| 4,182,307 | 1/1980 | Brindle et al. ................. 126/426 X |
| 4,203,420 | 5/1980 | Schoenfelder ..................... 126/426 |

Primary Examiner—Larry Jones
Attorney, Agent, or Firm—Robert W. Weig; Paul D. Gaetjens; Richard G. Besha

[57] ABSTRACT

The disclosure relates to an active solar collector having increased energy rejection during stagnation. The collector's glazing is brought into substantial contact with absorber during stagnation to increase re-emittance and thereby to maintain lower temperatures when the collector is not in operation.

1 Claim, 6 Drawing Figures

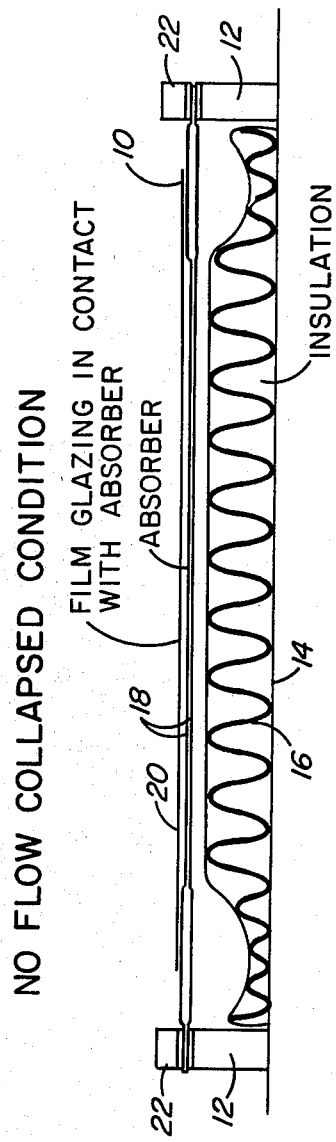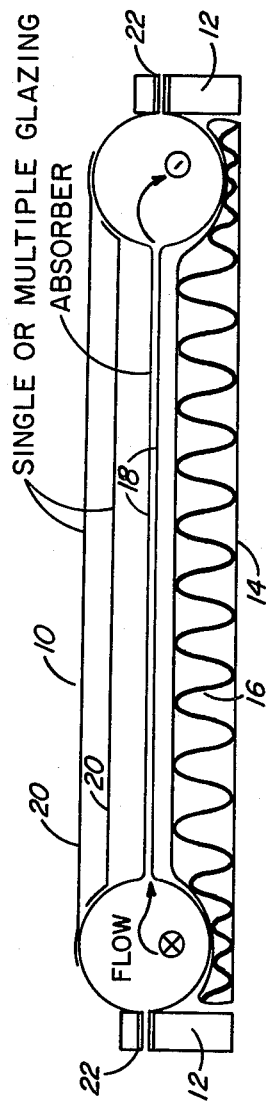

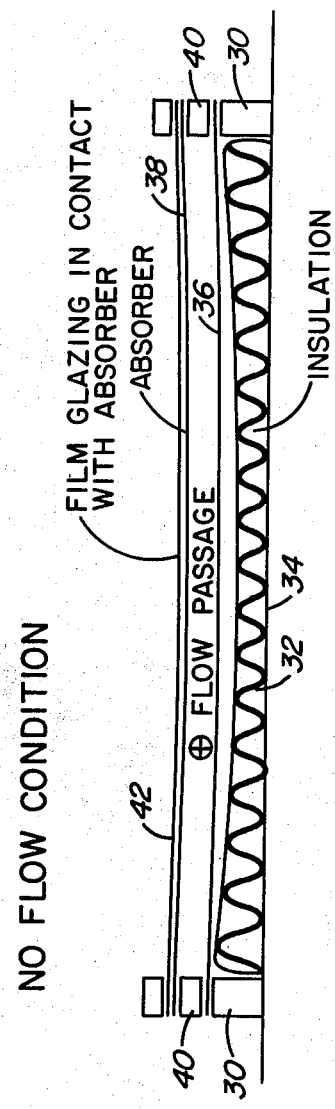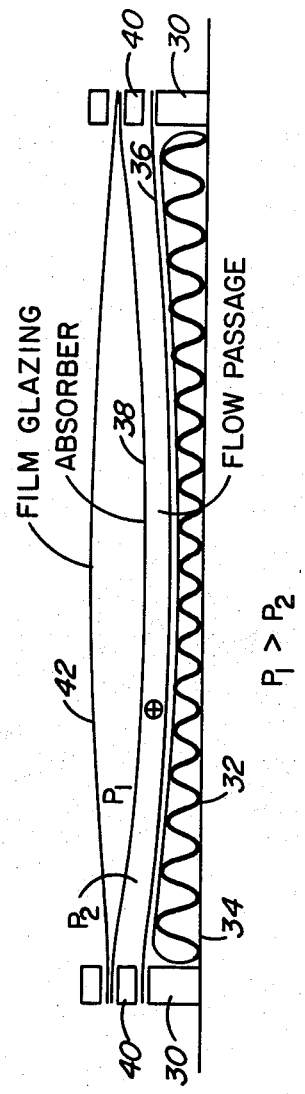

SOLAR COLLECTOR APPARATUS HAVING INCREASED ENERGY REJECTION DURING STAGNATION

The invention is the result of a contract with the Department of Energy (Contract No. W-7405-ENG-36).

BACKGROUND OF THE INVENTION

The invention relates to solar collectors and more particularly to solar collectors having substantially increased energy rejection during stagnation to facilitate the use of structural materials incapable of withstanding the high temperatures usually encountered in conventional solar collectors during stagnation.

A typical stagnating single glazed selective absorber collector will exceed 400° F. during stagnation. This requires that a typical collector be constructed of materials capable of withstanding at least such temperatures for extended periods of time during the down time or stagnation periods which typically occur during the summer months. Materials capable of withstanding such temperatures over a period of years in which a collector will be in use are much higher cost than materials capable of withstanding, for example, temperatures up to only about 180° F. for like periods of time.

There are, of course, many types of active solar collectors in use at present. Those supplying heat in the medium temperature range, i.e., temperature ranges between about 100° F. and about 250° F., utilize one or more cover sheets or glazing. While this glazing enhances the performance of such collectors, it also creates a problem in materials in that the glazings, the absorber, fluids flowing through the collector, insulation within the collector, and sealants used in constructing the collector all must be able to withstand increased temperatures during no-flow or stagnation conditions or periods. Since no energy is being extracted during such periods, the energy loss from the collector must equal the solar gain. This results in extremely high temperatures being reached within the collector, necessitating the use of expensive high temperature enduring collector materials. Such materials and components could comprise, for example, a glass or fluorocarbon film glazing, black chrome selective absorber, silicone or paraffinic oil heat transfer fluids, silicone, or polyimide foam or fiberglass with high temperature binders for insulations, and silicone, fluorocarbon or other high temperature sealants.

In the case of a selective absorber collector in accordance with the invention, energy is conducted from the low emittance selective absorber to the high emittance glazing and radiated and convected to the atmosphere like an unglazed collector, thereby maintaining low stagnation temperatures.

SUMMARY OF THE INVENTION

In accordance with the present invention, there is provided an apparatus for temperature limiting a solar collector comprising an absorber and a glazing deployed over the absorber. There may be one or more glazings in practicing the invention. The collector is constructed such that its glazing is spaced away from its absorber during operation of the collector and its glazing is brought in contact with its absorber during stagnation or no-flow periods to substantially increase energy rejected from the collector during such time and to thereby maintain a comparatively low temperature within the collector during such stagnation, no-flow, or down time. The glazing may be flexible and inflated during collector operation or it may be inflexible, being separated from and brought near or onto the absorber by mechanical or other means during stagnation. Collectors in accordance with the invention may utilize gas such as air, liquid or other heat exchange media.

One object of the present invention is to reduce the cost of constructing active solar collectors by enabling them to be constructed using lower cost materials which need not withstand the high temperatures reached in conventional collectors during stagnation.

Another object of the present invention is to maintain relatively low temperatures within an active solar collector during stagnation.

One advantage of the present invention is that active solar collectors in accordance therewith are less expensive because they are constructed from less expensive materials than conventional active collectors.

Another advantage of the invention is that collectors in accordance therewith should have a longer life than conventional collectors because they do not reach the high stagnation temperatures conventional collectors reach.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DESCRIPTION OF THE DRAWINGS

The accompanying drawings, which are incorporated in and made part of the specification illustrate two exemplary embodiments of the present invention and, together with the description, serve to explain the principles of the invention. In the drawings:

FIGS. 1 and 2 illustrate an exemplary, flexible glazing solar collector wherein glazing spacing is created by indirect pressurization in accordance with the invention; and, FIGS. 3 and 4 illustrate an exemplary flexible glazing solar collector wherein the glazing spacing is pressurized and expanded directly in accordance with the invention.

DETAILED DESCRIPTION OF THE PREFERRED EMBODIMENTS OF THE INVENTION

Figure 5:
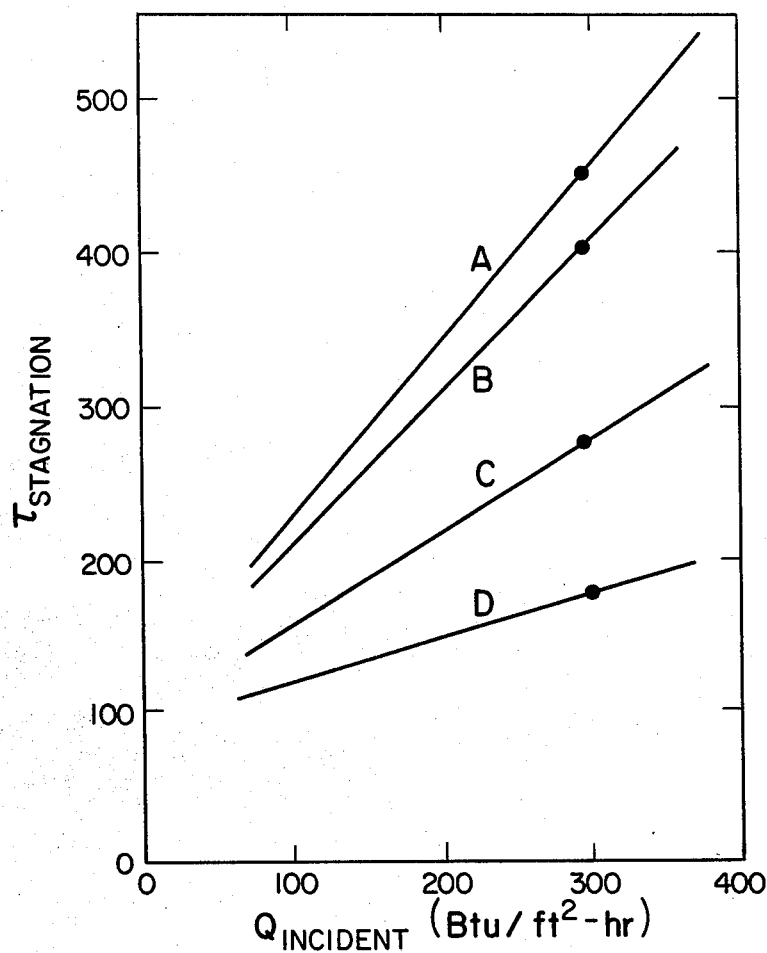
FIG. 5 shows stagnation temperatures for various types of collectors.

A good selective surface should have properties which vary from one spectral region to another. In solar collectors, low reflectance (high absorptance) is desired throughout the solar spectrum and high reflectance (low emittance) is desired in the thermal spectrum. By collapsing the glazing material on top of a selective solar absorber, the overall emittance will approach 0.9 and the device becomes a good emitter of energy.

Reference is now made to FIGS. 1 and 2 which show an inflatable solar collector constructed in accordance with the invention. The inflatable collector shown therein may be gaseous flow and for heat exchange use, for example, air, or may be liquid flow and for heat exchange use, for example, water. Because the structure and operation of many typical or common solar collectors is generally well known in the art, the figures show only cross sectional views which adequately serve to illustrate the essence of the invention. The means for producing flow, exit and entrance valves, the mounting of the unit on a building, all well known to those of ordinary skill in the art, are not elements of the invention, and for the sake of clarity, are not discussed herein. Those skilled in the art will recognize that a multitude of options are available in providing these elements in a solar heating application.

Turning now to FIGS. 1 and 2, a frame 12 mounted on a surface 14 supports the collector 10. Contained within frame 12 is insulation 16 which may comprise, for example, fiberglass, ceramic fiber, mineral fiber, foam or other insulating materials. Frame 12 may comprise wood, metal, plastic or other commonly available inexpensive material. Across frame 12 is disposed a flexible absorber, either selective or non-selective, 18 which may comprise, for example, a sheet of rubber, polymer, rubberized canvas, urethane impregnated nylon, or reinforced polymeric materials having high solar absorptance.

A selective absorber comprising foil, paint or the like may be bonded or otherwise attached to the absorber or be an integral part thereof. Mounted atop absorber 18 is a glazing 20 which may comprise a single layer or multiple layers of, for example, glass, acrylic, plastic elastomer, polymeric sheeting, scrim or mat reinforced plastics and the like. Glazing 20 is attached as shown to the flexible absorber by an adhesive, thermally or by other well known bonding devices, compounds or techniques. Absorber 18 attachs at edges 22 to frame 12 in a conventional fashion such as with an adhesive, brackets, nails or screws. FIG. 2, showing the collector in operation, illustrates the direction of gas or liquid flow and the separation of glazing 20 from absorber 18. FIG. 1 shows the no-flow or stagnation collapsed condition with the glazing and absorber in contact or near contact.

When a glazing 20 is in contact with a selective absorber 18 having an absorbance, $\alpha$, of 0.9 and an emittance, $\epsilon$, of 0.1, the combined $\epsilon$ approaches 0.9 causing the combination of glazing and absorber to become a good emitter of energy. During stagnation, energy is conducted from the absorber to the film or glazing to provide high energy dissipation much like an unglazed collector. Optical tests have shown a PVF film in contact with a selective absorber having an $\alpha$ of about 0.9 and an $\epsilon$ of about 0.1 raises the overall $\epsilon$ to greater than 0.8. This serves to maintain a lower temperature during stagnation. Heat mirror coated glazings, i.e., those having low $\epsilon$ inner surfaces, can be used similarly to eliminate radiation and convection resistances during no-flow conditions. Because the glazing is essentially in contact with the absorber during the no-flow collapsed condition seen in FIG. 1, the material used to construct the collector such as the insulation, the adhesive attaching the glazing to the absorber, the adhesive attaching the absorber to the frame, the frame material, the glazing material, and the absorber material can all be lower coast than present collector materials because their temperature will not rise above about 180° F. during stagnation. If the collector of FIG. 2 were to remain in the inflated configuration of FIG. 2 during stagnation, the absorber related materials from which it must be constructed would typically have to survive about 400° F. temperatures, the inner glazing materials about 300° F. and the outer covers about 200° F. Such a device necessarily would have to be constructed of higher cost, higher heat resistant materials such as glazings of glass, polycarbonate, fluorocarbons, or silicons; absorbers of metal, or high temperature polymers; silicon or EPDM sealants and insulations of glass, ceramic or mineral fibers. By maintaining lower temperatures during stagnation, lower cost plastics, polymers, woods, selective absorbers, paints, sealants and foam insulations can be used. Too, lower temperatures usually result in longer life for components.

FIGS. 3 and 4 illustrate another embodiment of an active solar collector having flexible glazing. The FIG. 3-FIG. 4 collector uses a gas, preferably air, for heat exchange. Direction of flow is as indicated. The embodiment shown comprises a frame 30 incorporating insulation 32 mounted on a surface 34. A flow channel divider 36 disposed atop insulation 34 attaches to frame 30 by an adhesive, nails, screws, clamps or the like. An absorber 38 is spaced from divider 36 by a spacer 40 on frame 30 and is attached to the frame 30 also by an adhesive or mechanical devices. The absorber may comprise, for example, rubber, polymer, rubberized canvas, urethane impregnated nylon, and reinforced polymeric materials having high solar absorptance. A glazing 42 comprising a flexible sheet or sheets, such as Tedlar®, Teflon®, Kynar®, EVA, PAN, Acrylic, Silicone, FRP's etc. is mounted on frame 30 above absorber 38 on spacer 40 and is attached thereto by conventional means. During the no-flow condition illustrated in FIG. 3 glazing 42 is in substantial contact with second absorber 38. This causes the collector to re-emit energy and maintain a lower temperature during stagnation or no-flow conditions than it would if the glazing and absorber were spaced apart. During operation in the expanded flowing condition of FIG. 4, glazing 42 separates from absorber 38 to restrict remittance and convection losses of the collector.

FIG. 5 graphically depicts stagnation temperatures under varying conditions for several types of collectors. Stagnation temperatures for a double glazed collector with a selective absorber where $\alpha=0.9$ and $\epsilon=0.1$ is shown by line "A". Line "B" shows stagnation temperatures for a single glazed collector with a selective absorber where $\alpha=0.9$ and $\epsilon=0.1$. Lines "C" and "D" represent, respectively, stagnation temperatures for an unglazed selective absorber with $\alpha=0.9$ and $\epsilon=0.1$ and an unglazed collector collapsed in an absorber in accordance with the invention where $\alpha=0.9$ and $\epsilon=0.9$.

Figure 6:
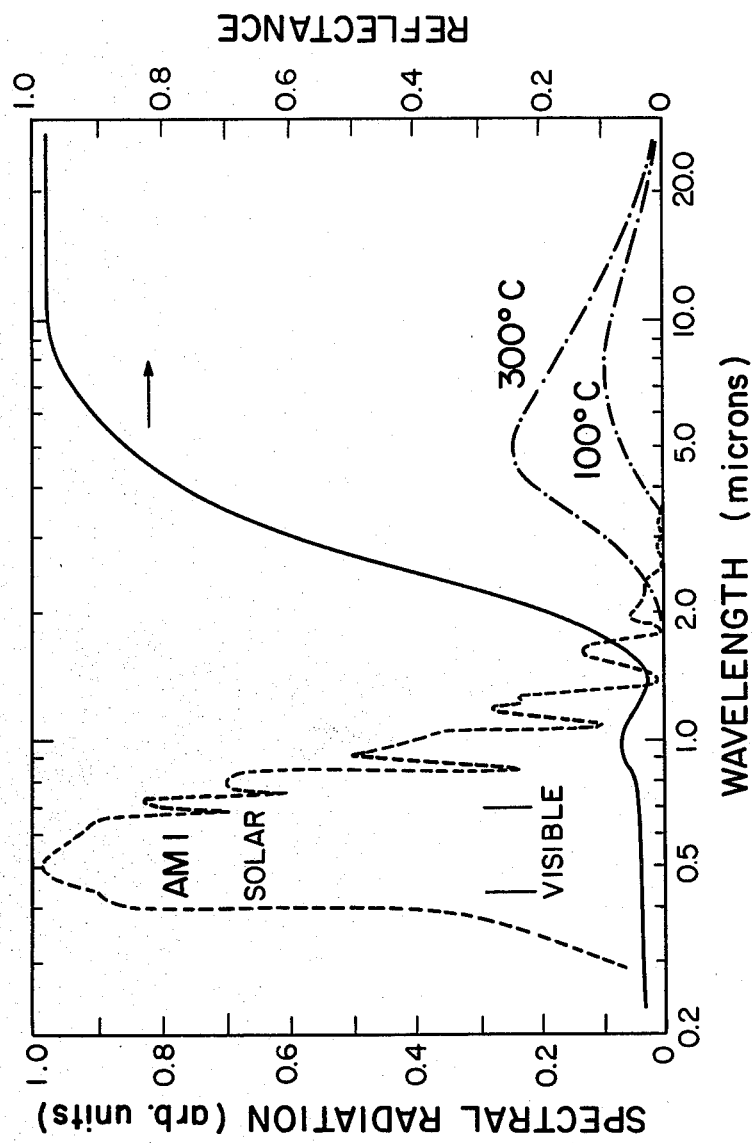
FIG. 6 shows, for a typical selective absorber, the solar and two thermal emittance spectrums.

FIG. 6 shows re-emittance spectra for an exemplary collapsed collector in accordance with the invention.

The systems of the two illustrated embodiments are each activated by loss of pressure in the air or liquid circulating through the collector. Alternatively, pneumatic, hydraulic or other mechanical devices may be used to bring in contact and separate the glazing from the absorber.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments chosen were described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for temperature limiting a solar collector comprising:

an absorber;

a layer of insulation disposed beneath said absorber;

glazing disposed over said absorber, said absorber and said glazing being constructable from materials incapable of withstanding temperatures above about 180° F. for an extended period of time, said glazing comprising the topmost layer of said apparatus and said glazing being heat mirror coated to give it a low $\epsilon$ inner surface to eliminate radiation and convection resistance during stagnation periods; and means for spacing said glazing away from said absorber during operation of said collector and for bringing said glazing substantially in contact with said absorber during stagnation to substantially increase energy convected and re-emitted from said collector, thereby maintaining a temperature below about 180° within the said apparatus during stagnation.

* * * * *